US010375454B1

(12) United States Patent
Parker

(10) Patent No.: US 10,375,454 B1
(45) Date of Patent: Aug. 6, 2019

(54) AUDIO DATA AND IMAGE DATA INTEGRATION

(71) Applicant: Amazon Technologies, Inc., Seattle, WA (US)

(72) Inventor: Zachary Jedd Parker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/605,258

(22) Filed: May 25, 2017

Related U.S. Application Data

(63) Continuation of application No. 14/859,953, filed on Sep. 21, 2015, now Pat. No. 9,716,922.

(51) Int. Cl.

| | |
|---|---|
| ***H04N 21/854*** | (2011.01) |
| ***G11B 27/036*** | (2006.01) |
| ***H04N 21/84*** | (2011.01) |
| ***H04N 21/234*** | (2011.01) |
| ***H04N 21/235*** | (2011.01) |
| ***H04N 21/233*** | (2011.01) |

(52) U.S. Cl.

CPC ......... *H04N 21/854* (2013.01); *G11B 27/036* (2013.01); *H04N 21/233* (2013.01); *H04N 21/2353* (2013.01); *H04N 21/23424* (2013.01); *H04N 21/84* (2013.01)

(58) Field of Classification Search

CPC ............... H04N 21/854; H04N 21/233; H04N 21/23424; H04N 21/2353; H04N 21/84; G11B 2220/90; G11B 27/036; G11B 27/024

USPC .......................................................... 386/285

See application file for complete search history.

(56) References Cited

U.S. PATENT DOCUMENTS

| | | | | |
|---|---|---|---|---|
| 5,588,842 | A * | 12/1996 | Nishimura | G09B 5/065 348/478 |
| 8,875,170 | B1 * | 10/2014 | Daniel | H04N 21/4524 725/25 |
| 2012/0062729 | A1 * | 3/2012 | Hart | G06F 1/1626 348/135 |
| 2012/0213426 | A1 * | 8/2012 | Fei-Fei | G06K 9/00664 382/159 |
| 2016/0205148 | A1 | 7/2016 | Lee et al. | |
| 2017/0139657 | A1 * | 5/2017 | Shah | G06F 17/30029 |

* cited by examiner

*Primary Examiner* — Loi H Tran

(74) *Attorney, Agent, or Firm* — BakerHostetler

(57) ABSTRACT

Techniques for integrating audio data and image data are described herein. A plurality of image data items associated with a first user account and a plurality of image data descriptors, each associated with at least one of the plurality of image data items may be received. A first audio data item, having at least one associated audio data descriptor, may be selected for playing. Based at least in part on a comparison of the at least one audio data descriptor and the plurality of image data descriptors, at least a first image may be selected from the plurality image data items for presentation with the first audio data item. During at least part of the playing of the first audio data item, the first image may be presented.

20 Claims, 9 Drawing Sheets

| Available Image Data Descriptors 505 |
|---|
| Bill |
| Mary |
| Todd |

Table 540

| Photo 510 | Associated Image Data Descriptor 515 | Eligible for Selection? 520 |
|---|---|---|
| W | Bill | Yes |
| X | Jeff | No |
| Y | Erin | Yes |
| Z | Peter | No |

FIG. 5

AUDIO DATA AND IMAGE DATA INTEGRATION

CROSS-REFERENCE TO RELATED APPLICATION

This application is a continuation of U.S. patent application Ser. No. 14/859,953 filed on Sep. 21, 2015, the disclosure of which is hereby incorporated by reference in its entirety.

BACKGROUND

Modern technology has enabled users to obtain vast amounts of different content, such as audio data and image data, quickly and conveniently using a variety of different devices, potentially at different times and locations. For example, music services, such as streaming music services, may provide users with the abilities to access and play music from large remote libraries, often without the need to individually purchase or maintain the music on their own personal devices. Modern technology has also allowed users to efficiently capture and store large amounts of image data, such as photographs, graphical images, and videos, using convenient and high quality devices, such as phones, tablets, and other camera-enabled devices. The availability and ease-of-use of such image capture and image display devices now allows us to capture important moments, events and people in our lives as we never could before. However, despite the improvements within these technologies, the opportunities to integrate and personalize user experiences across these technologies remain limited. For example, while users may have access to large audio libraries spanning many genres of music or other audio, there is often minimal opportunity for users to integrate these large audio libraries with their own personal lives and experiences. Additionally, while users may have access to personalized photographs and videos, the user may be unable to effectively or efficiently link this image data to other types of data that may compliment and enhance the user's appreciation of the personal experiences that the image data captures and represents.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating example image data descriptors that are eligible for selection that may be used in accordance with the present disclosure.

DETAILED DESCRIPTION

Figure 1:
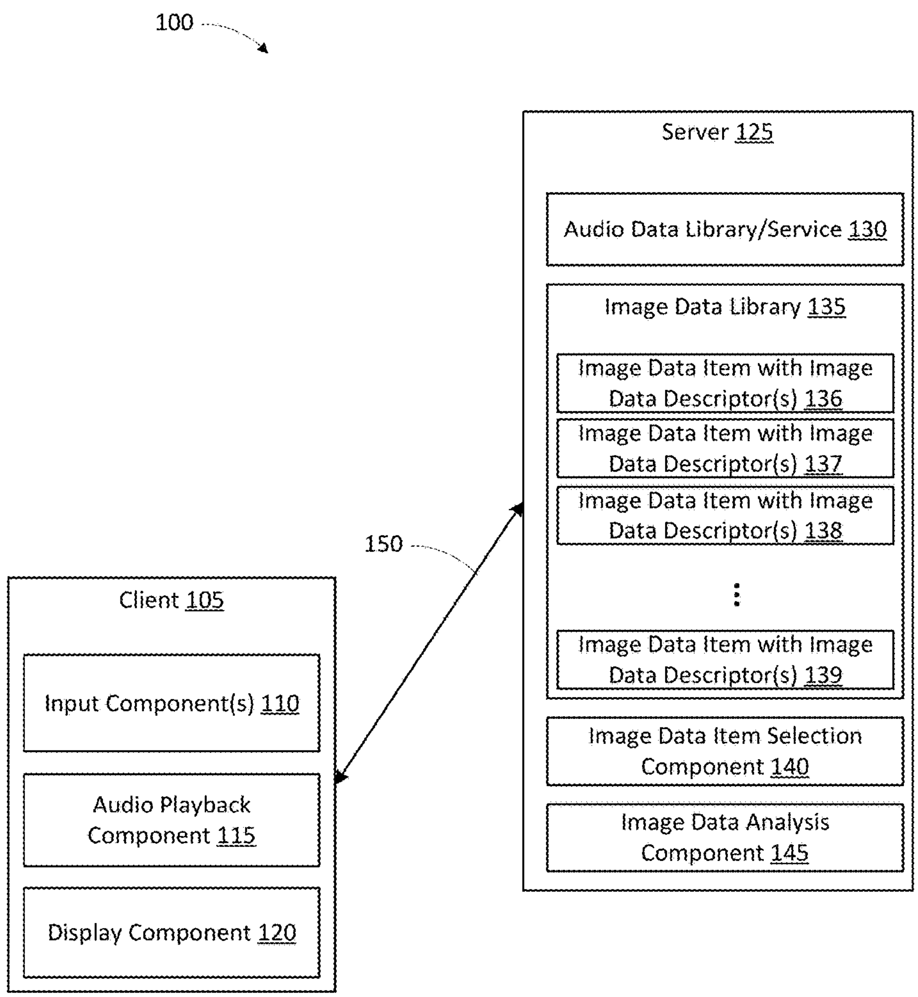
FIG. 1 is a diagram illustrating an example system for integrating audio data and image data that may be used in accordance with the present disclosure.

Techniques for integrating audio data with image data are described herein. Generally, in some examples, image data items, such as photographs, graphical images, and videos, may be linked with audio data items, such as songs and music, which share one or more characteristics. The described techniques may include, for example, receiving a plurality of image data items associated with a first user account, for example, from a local image data library, from a remote image or social networking service, etc. One or more image data descriptors may also be received, with each image data descriptor associated with and describing contents of at least one of the plurality of image data items. The image data descriptors may be associated with one or more image data items, for example, via user input or other information when the image data item is received (e.g., uploaded to a service or saved in a library), or may be auto-generated based on various types of computer-based image analysis, such as object recognition and/or edge detection. The image data descriptors may describe contents of each associated image data item, such as a person or object that is displayed in the image data item and/or an attribute associated with a person or object that is displayed in the image data item. Image data descriptors may indicate, for example, one or more individuals, a group, a theme, an event, a location, an age, a date, a gender, and other descriptors or characteristics that may be displayed in or associated with an image data item. Upon receiving instructions to play an audio data item, such as a song, having at least one audio data descriptor, at least one image data item from a plurality of received image data items may be selected based, at least in part, on the at least one audio data descriptor and the plurality of image data descriptors. The at least one selected image data item may then be displayed during at least part of the playing of the first audio data item. In these and other examples, audio data content may become more personalized and relevant to the user, while the viewing of image data may be enhanced with other forms of associated and related content, thereby providing a more interesting and improved user experience.

In some examples, the audio data descriptor(s) of a song selected to be played may be compared with image data descriptors associated with at least one of the plurality of image data items to identify commonality or shared descriptors or features between an image data item and the audio data item. In some cases, one or more audio data descriptors, which may follow the same or a different classification scheme as the image data descriptors, may, for example, be automatically or manually generated and associated with an audio data item, for example, based on user input, characteristics of the audio data item, metadata associated with audio data item, and so. One or more image data items, for example, may be selected based on a correlation, e.g., more common factors or descriptors shared between the image data item(s) and the audio data item. In some examples, image data items may be selected according to a degree of correlation, such that image data items having more common features or characteristics may be selected over, or in priority to, image data items having less common features with the audio data item.

In some examples, the audio data items and/or the plurality of image data items available for presentation may be associated with a particular user account. In some cases, the user account may be associated with a streaming music service, such that the first audio data item may be streamed over a communications network, to be played on a client device. In some examples, the image data items may be received from a variety of sources, such as from a phone, tablet, camera, or other camera enabled device, one or more social networking sites, a cloud based image or photo service, etc.

In some cases, the described techniques may further include filtering, limiting, or selecting which image data descriptors are available for use, and hence controlling which image data items are available for integrating with an audio data item. In some aspects, making an image data descriptor or descriptors available for use may be based on location or proximity of a device associated with image data descriptor(s). For example, it may first be determined that a first device associated with a first image data descriptor, such as a name of an owner or user of the device, is within a specified locational proximity of a second device that plays the first audio data item. The first image data descriptor associated with the first device may then be made available for use based on the detected or determined proximity of the first device to the second device. In this way, image data may be even more precisely tailored to, for example, users/devices that are in a room, connected to a particular communications network, etc. In another example, an image data descriptor may be made available for use based on a user request/input. In some cases, individual image data items or groups of image data items may be made available for use, for example, also via user input or selection.

An example of the above described techniques is a karaoke implementation. In some examples, devices within a certain locational proximity may be detected and image data descriptors relating to each device may be obtained, or derived from identification information of the devices, such as a user or owner/operator name, etc. The image data descriptors associated with these devices, such as images including owners/operators of the devices, may then be made available for use, and images including these individuals may be displayed during particular songs. The displayed images may then be used to queue or indicate a selected user to participate in a karaoke session with a particular song or audio data item.

FIG. 1 is a diagram illustrating an example system 100 for integrating audio data and image data that may be used in accordance with the present disclosure. As shown, system 100 includes a client device 105 in communication with a server 125 via communication link 150. The client device 105 may include any of a number of devices, such as a smart phone, tablet, laptop, computer, or other computing device or node. The server 125, which may be local or remote from the client device 105, may include multiple servers and may be implemented using any number of different remote or local nodes or devices. Communications link 150 may include one or more communications networks, including, for example, a local area network (LAN) and/or a wide area network (WAN), such as the Internet.

The client device 105 may include an input component 110, such as a full or partial keyboard, touch screen interface, etc., an audio playback component 115, such as speakers or headphone output(s), and a display component 120, which may include a screen or touchscreen, for example.

The server 125 may include an audio data library or service 130, such that stores or has access to audio data items (e.g., songs, other musical items, etc.). In one example, audio data library/service 130 may include a streaming music service. The server 125 may additionally include or have access to an image data library 135. The image data library may store any number of image data items 136-139, such as photographs, graphical images, videos, and other image data items. Each image data item 136-139 may be associated with one or more image data descriptors that may indicate, for example, one or more individuals, a group, a theme, an event, a location, an age, a date, a gender, and other descriptors or characteristics that may be displayed in or associated with an image data item. The server 125 may additionally include an image data item selection component 140 and an image data analysis component 145. In some aspects, as will be described in greater detail below, the image data analysis component 145 may perform a variety of computer-based image analyses on an image data item to derive one or more descriptors to associate with the image, such as using various forms of object recognition, edge detection or other image analysis.

In some examples, the client device 105 may receive one or more image data items. For example, in some cases, the client device 105 may include a camera component for capturing the images. In other examples, the client device 105 may be connected, via wired or wireless connection, to one or more other camera enabled devices, such as a phone, tablet, camera, or other camera-enabled device. In response to receiving the one or more image data items, the client device 105 may prompt a user of the client device 105 to enter identification information, tags, or other descriptors relating to the image data items. Upon receiving at least one image data descriptor, the client device 105 may communicate the image data item along with the image data descriptor(s) to the server 125. The server 125 may store the image data item with the associated image data descriptor(s) in the image data library as an image data item 136-139. In another example, the image data library 135 may gain access to or obtain one or more image data items in other ways, such as via a user associating a social networking site or service to the image data library 135, receiving one or more image data items from another device, and so on.

As set forth above, in some examples, one or more image data items may be provided to the server 125 along with one or more associated image data descriptors provided by a user. In other examples, one or more image data items may be provided to the server 125 without receiving any associated image data descriptors. In either case, the image data analysis component 145 of the server 125 may analyze the received image data items, such as by performing object recognition, edge detection or other computer-based image analysis techniques on the image, to automatically derive one or more image data descriptors to be associated with the received image data items. In some cases, the image data analysis component 145 may also examine metadata associated with the image to assist in determining relevant image data descriptors to associate with the image. The image data analysis component 145 may communicate the image data items along with at least one associated image data descriptor to the image data library 135 for storage as an image data item 136-139. In other cases, the image data analysis component 145 may communicate an indication of the image data items and the associated image data descriptors back to the client device 105, for user confirmation. Upon confirmation, the image data items and selected image data descriptors may then be stored in the image data library 135. An example organizational or classification system/structure used to associate image data descriptors with image data items will be described in greater detail in reference to FIGS. 3 and 4 below.

Upon receiving a request or instructions to play an audio data item or set of audio data items (e.g., a playlist), the client device 105 may request the audio data item or file from the audio data library/service 130. The client device 105 may subsequently receive the audio data items for playback via the audio playback component 115, from the audio data library/service 130 managed by server 125. In some cases, the audio data items may be streamed to the client device 105 via communication link 150, for example, when the audio data library/service 130 includes a streaming music service. A streaming music service may employ streaming content delivery techniques, in which content may be received by and presented to a user while the content is being delivered. In other cases, the client device 105 may download the audio data items from the server 125 or may even access the audio data items locally on the client device 105 (e.g., when at least part of audio data library/service 130 is stored on the client device 105).

In combination with selection of an audio data item for playing, the client device 105 may request selection of at least one image data item for presentation during the playing of the audio data item. The image data item selection component 140 of server 125 may retrieve one or more audio data descriptors associated with the audio data item selected for play, for example, from the audio data library/service 130. The audio data descriptors may, for example, describe contents of the audio data items, such as various characteristics associated with music, speech, or other sounds that are generated based on playing of the audio data items. For example, the audio data descriptors may indicate themes associated with the audio data items, such as happy, sad, romantic, and others. The audio data descriptors may also indicate other characteristics associated with audio data items, such as one or more individuals, a group, an event, a location, an age, a date, a gender, and others. The audio data descriptors may be determined and/or associated with an audio data item in a number of ways, such as based on artist, genre, album, release date, audio qualities, such as tempo, frequency characteristics, time characteristics, key, and so on. For example, higher pitched sounds may sometimes be associated with happy or excited themes, while lower pitched sounds may sometimes be associated with sad or serious themes. In some examples, the audio data library/service 130 may manage audio data descriptors, tags, or various metadata and independently associate and store this information. In other cases, the audio data library/service 130 may provide for manual entry, e.g., via input by a user via client device 105, of descriptors to associate with audio data items.

Upon obtaining at least one audio data descriptor associated with the audio data item selected for playback, the image data item selection component 140 may then search for image data items 136-139 having related image data descriptors in the image data library 135. Processes for the comparison of image data descriptors with audio data descriptors and the selection of image data descriptor(s) with higher correlations to the audio data descriptor(s) will be described in greater detail below in reference to FIGS. 3 and 4. Upon selecting an image data item having at least one at least partially related image data descriptor, the image data item selection component 140 may communicate the selected image to the client device 105 for presentation via the display component 120, during playback of the selected audio data item.

In some examples, the image data item selection component 140 may select a number of image data items that at least partially relate to a single audio data item for presentation during the playback of the audio data time. In some cases, the image data item selection component 140 may determine a number of image data items to present during the playback of the selected audio data time based on a length of time associated with playing of the audio data item. Also, in some cases, such as when one or more video items are selected for presentation, the number of image data items to present during the playback of the selected audio data time may be based on a length of the video items. It is further noted that, in some examples, video items may be recorded along with combined audio data, such as voices of people speaking in the video items. In some examples, when video items are displayed during playing of a selected audio data item, the combined audio data that was recorded with the video item may be stripped from the video item, not transmitted, or otherwise disabled such that the combined audio data does not interfere with the playing of the selected audio data item.

In some examples, a group of audio data items may be selected for playback, such as, for example, a playlist of songs. In this scenario, image data items may sometimes be selected based on correlations between image data descriptors and audio data descriptors associated with each song individually. In other cases, however, the playlist or group of audio data items may also be associated with playlist or group audio data descriptors. In these cases, image data items may sometimes be selected based on correlations of image data descriptors with group audio data descriptors. In this way, a more coherent image presentation may sometimes be displayed in coordination with the playback of a music playlist, for example.

It is noted that FIG. 1 merely provides one example system for implementing audio and image integration techniques and that many variations of system 100 may be employed. For example, in some cases, various server components, such as image data library 135, image data item selection component 140, and image data analysis component 145 may instead be included on client 105 and/or other devices or may be distributed across server 125, client 105 and/or other devices.

Figure 2:
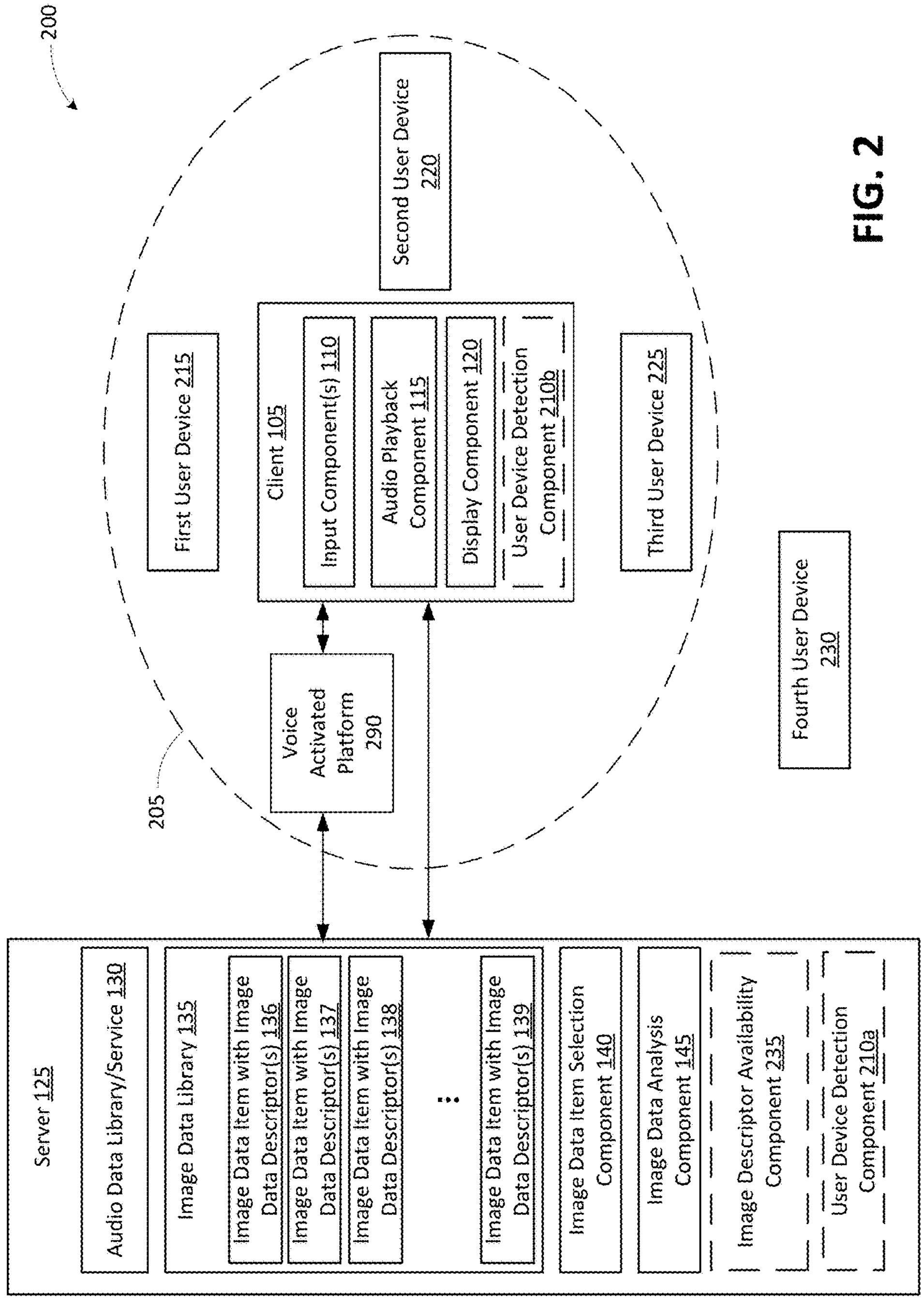
FIG. 2 is a diagram illustrating an example system, including multiple user devices, for integrating audio data with image data that may be used in accordance with the present disclosure.

FIG. 2 illustrates another example system 200, including multiple user devices, for integrating audio data and image data that may be used in accordance with the present disclosure. As shown, system 200 includes a client device 105 in communication with a server 125 via communication link 150. The client device 105 may be associated with a network or within a locational range or area 205, for example, along with first user device 215, second user device 220, and third user device 225. As illustrated, another user device, forth user device 230, is not associated with range 205. As described above in reference to FIG. 1, the client device 105 may include an input component 110, an audio playback component 115, and a display component 120. Each of user devices 215, 220, 225 may also include these or similar components with similar functionality as described above. The client device 105 may also include a user device detection component 210*b*, which will be described in greater detail below. The server 125, as described above, may include an audio data library or service 130, include or have access to an image data library 135, and include an image data item selection component 140 and an image data analysis component 145. In some cases, the server 125 may additionally or alternatively include a user device detection component 210*a* and an image data descriptor availability component 235.

System 200 may provide for selecting image data items for presenting during the playing of one or more audio data items based on correlations between image data descriptors associated with one or more image data items and audio data descriptors associated with a selected audio data item, as described above. System 200 may also provide for selecting or narrowing the image data descriptors available for use, e.g., available for comparison with audio data descriptors and subsequent presentation if a correlation is found, based on various factors. One such factor may include whether a user device, such as user devices 215, 220, 225 is within a certain range 205 of the client device 105. Each user device that is within range 205 may be associated with identification information that may be compared to image data descriptors for determining which image data items to make available for use or presentation during the playing of a selected audio data item.

In a first example, image data descriptors may be made available for use based on user devices that are determined to be within a proximity (e.g., based on location, connection to a shared network, based on distance, etc.) of the client device 105. In one aspect, a user device detection component 210 may be implemented on the client device 105 as component 210*b*. The user device detection component 210*b* may use any or all of a variety of technologies to determine which, if any, user devices 215, 220, 225, or 230, are within a specified or configurable range 205 of the client device 105. This may include using Global Positioning System (GPS) services, dead reckoning technology, network-based identification (e.g., determining whether other user devices are connected to the same network, such as a local area network (LAN) or wireless local area network (WLAN), Bluetooth network, etc., either by detecting/sending a request directly to other user devices 215, 220, 225, or coordinating with an access point or other network device). During or subsequent to identifying other user devices 215, 220, 225 that are within a range 205 of the client device 105, the client device 105 may request from each user device 215, 220, 225 identification information. As illustrated in FIG. 2, user device 230 is not within range 205. Accordingly, identification information associated with device 230 of this device 230 will not be retrieved or used. In this way, as will be described below, only image data items associated with image data descriptors correlating to user devices within range will be used for selecting image data items to present during playback of an audio data item.

The identification information may include a user name, owner name, or other data associated with particulars of the device 215, 220, 225 and the user of the device. The identification information from each device may then be communicated to the server 125. Alternatively, the user device detection component 210*a* associated with server 125 may perform the above-described operations. The image data descriptor availability component 235 of server 125 may, based on the identification information associated with each in-range user device 215, 220, and 225, determine which image data descriptors to make available for use, such as to limit or narrow the number of image data items for presentation to be more relevant to the users/user devices 215, 220, 225 within a range 205 of client device 105. Upon determining that at least one image data descriptor of image data items in library 135 correlates to the identification information of a user device 215, 220, 225, the image data descriptor availability component 235 may communicate the limiting image data descriptor(s) to the image data item selection component 140. The image data item selection component 140 may then search for image data items with the specified limiting image data descriptors upon receipt of a request to present an image, such as in response to the playing of an audio data item.

In some cases, the identification information associated with an in-range user device 215, 220, 225 may include a name, identifier, or other indication of an owner or operator of the user device 215, 220, 225. In this scenario, the identification information may sometimes be directly used to search for matching or correlated image data descriptors. In other examples, the identification information of a user device 215 may not directly correspond to an image data descriptor used in the image data library 135. In this scenario, the image data descriptor availability component 235 may map the identification information to image data descriptors used in the image data library. In some cases, the mapping may include requesting confirmation of one or more image data descriptors from a user via client device 105.

A particular example of this implementation is the operation of a karaoke application, such as controlled by client device 105. Upon launching a karaoke application, the user device detection component 210*b* of the client device 105 may search for and identify user devices 215, 220, 225 within a range 205 of the client device 105, such that will participate in karaoke. The user device detection component 210*b* may obtain identification information from the user devices 215, 220, 225 and communicate the identification information to the server 125. The image data descriptor availability component 235 may determine that only image data items associated with image data descriptors that correlate to the identification information may be made available for use. Based on this information, the image data item selection component 140 may search for and retrieve at least one image data item 136-139 associated with each image data descriptor (e.g., names of individuals who are participating in karaoke). The server 125 may then communicate the image data items with associated image data descriptors to the client device 105. The client device 105 via display component 120 may then display the image data item associated with an image data descriptor (e.g., name) of the individual who's turn is next in karaoke. In this way, system 200 may automatically indicate or queue which player is next in line for interaction with an application running on the client device 105, such as karaoke, (or alternatively, the application could be running on the server 125 in coordination with client device 105), by displaying an image of the next player. As will be appreciated, the above is given only as an example. The techniques described herein may be implemented to provide other types of image data presentations associated with the playing of audio data items, more interactive features, etc.

In another example, a user of client device 105 may manually select and make certain image data descriptors available for use. In the karaoke example, a user of client device 105 may manually enter names or other identifiers of individuals who will be participating in karaoke. In other examples, the client device 105 may receive various different indications of image data descriptors to be made available for use, such as to personalize an image presentation to people or guests who are in close proximity to the client device 105 or a presentation device (not shown), to present image data items to users of other applications or games, and so on.

As also shown in FIG. 2, system 200 may include a voice activated platform 290, which may interact with client 105, server 125, and other components or devices. Voice activated platform 290 may include one or more microphones for receiving voice instructions, for example to execute various audio and/or image data related operations, such as recording and/or playing of audio, image, and/or video data, performing various aspects of the audio data and image data association and integration techniques described herein, and other operations. In some examples, voice activated platform 290 may include or otherwise be integrated with audio, image and/or video recording devices. Also, in some examples, voice activated platform 290 may include or otherwise be integrated with audio speakers, display screens, and other output components. For example, in some cases, voice activated platform 290 may be instructed to capture and record audio, image, and/or video data for a party or other event occurring within or associated with range 205. The recorded audio, image, and/or video data may then be integrated with other audio, image, and/or video data, such as by using the descriptor-based techniques described herein. As another example, voice activated platform 290 may be instructed to play audio data items and may perform, or cause to be performed, descriptor-based image data item correlation techniques for displaying one or more associated image data items.

Figure 3:
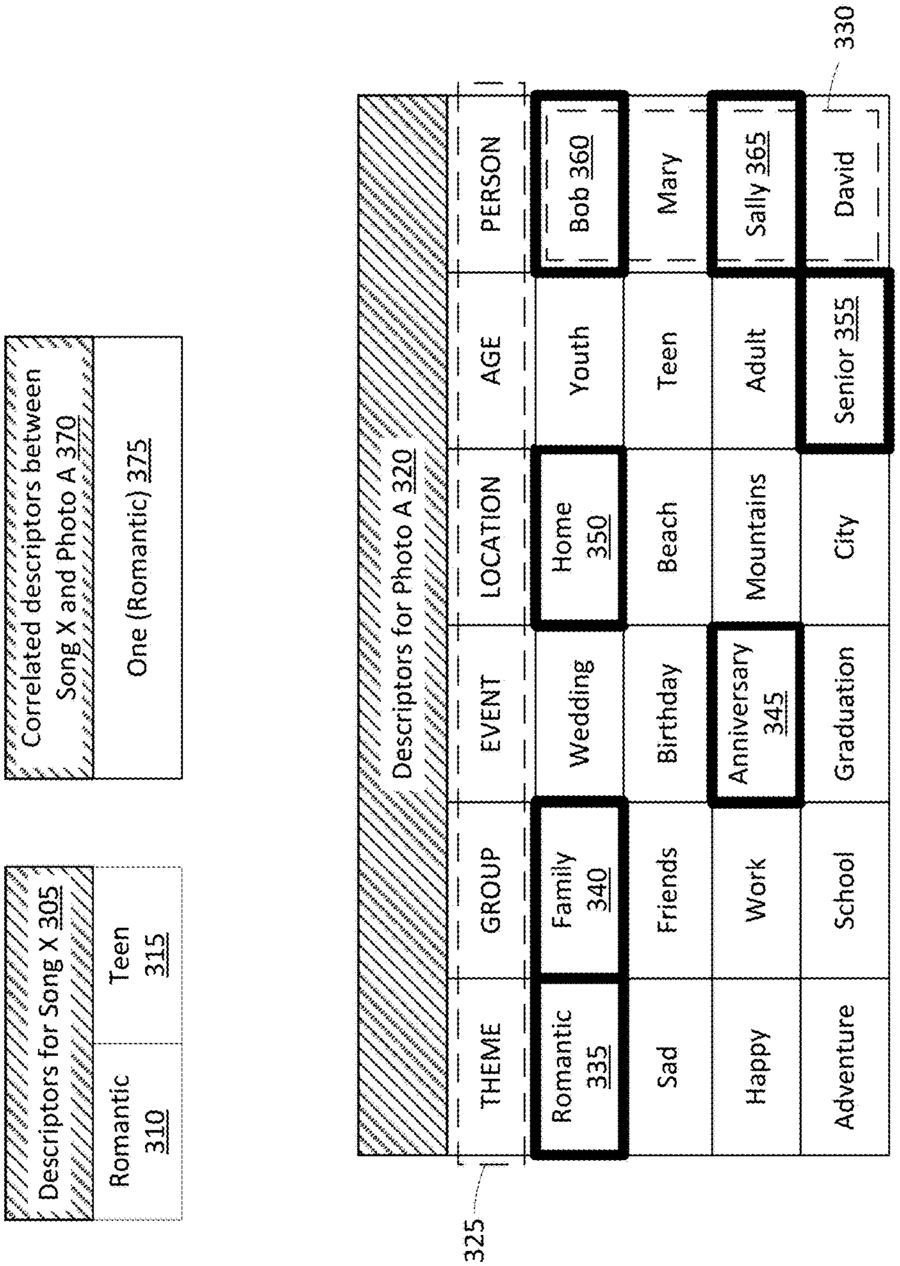
FIG. 3 is a diagram illustrating example image data descriptors, audio data descriptors, and descriptor correlations that may be used in accordance with the present disclosure.

FIG. 3 is a diagram illustrating example image data descriptors, audio data descriptors, and descriptor correlations that may be used in accordance with the present disclosure. The example descriptors and correlations shown in FIG. 3 may be implemented by various aspects of systems 100 and 200 described above. In particular, the example descriptors and correlations shown in FIG. 3 may, for example, be implemented by the image data item selection component 140 in coordination with the audio data library/service 130 and the image data library 135.

In the example illustrated, chart 305 shows that a particular song, referred to as Song X, is associated with two audio data descriptors 310 "romantic" and 315 "teen." In some cases, these descriptors may be generated (e.g., automatically or without user input) by the audio data library/service 130. In other cases, the server 125 may associate one or more descriptors with each audio data item, for example, based on metadata associated with audio data item, via access to an additional or external service, etc. In some cases, audio data descriptors from an external service may be mapped to audio data descriptors that correspond to image data descriptors in the image data library 135, for example to enable better correlation between audio data items and image data items.

Additionally, chart 320 shows that a particular photo, referred to as Photo A, is associated with one or more image data descriptors, such as 335 'romantic," 340 "family," 345 "anniversary," 350 "home," 355 "senior," 360 "Bob," and 365 "Sally." In one example, image data descriptors may be organized into categories or classifications 325, such that each category 325 includes a group 330 of image data descriptors. As illustrated, the different categories may include "theme," "group," "event," "location," "age," and "person" or name. Other categories 325 may also be used, and/or other types or organizational structures may be implemented for associating image data descriptors to image data items. As described above, these image data descriptors may be associated with Photo A based on user input or selection, and/or based on image analysis performed by the image data analysis component 145. In one example, the image data analysis component 145 may perform an object recognition and/or edge detection analysis on one or more image data items to be stored in the image data library 135. The image data analysis component 145 may identify various objects and correlate those objects with one or more identifiers, such as identifying a ball and an umbrella in a photo. The identifiers may then be used to derive image data descriptors, for example individually or in combination, according to various defined relationships or other techniques. In the above example, the ball and the umbrella may be combined to yield the "beach" image data descriptor. Once associated with at least one image data descriptor, Photo A may be stored in the image data library 135.

Upon receiving a request to play Song X, the image data item selection component 140 may, as shown in box 370, search in the image data library 135 and determine that Photo A has at least one descriptor 375 in common with Song X. In the example illustrated, Photo A may be retrieved as a correlated photo to Song X based on the common descriptor "romantic" 375.

Figure 4:
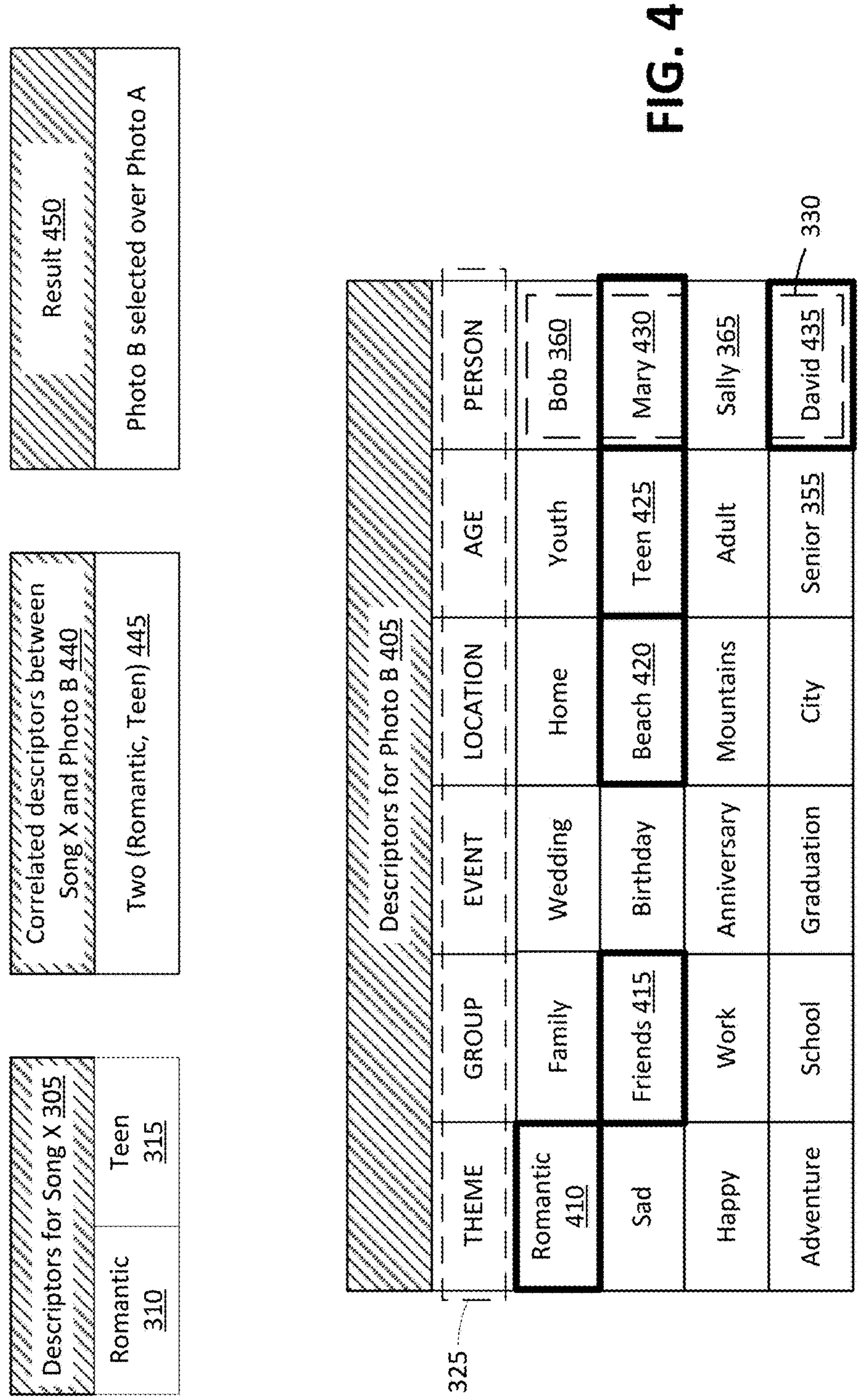
FIG. 4 is a diagram illustrating other example image data descriptors, audio data descriptors, and descriptor correlations that may be used in accordance with the present disclosure.

As illustrated in FIG. 4, the image data item selection component 140 may also, as shown in box 440, retrieve Photo B based on a correlation between the image data descriptors of Photo B and the audio data descriptors 310, 315 of Song X. As illustrated in chart 405, Photo B may be associated with descriptors 410 "romantic," 415 "friends," 420 "beach," 425 "teen," 430 "Mary," and 435 "David." Photo B may thus share common descriptors 445 with song X, including, 410 "romantic" and 425 "teen."

In the case where multiple photos (e.g., Photo A and Photo B) that share common descriptors with Song X are retrieved, the image data item selection component 140 may, for example, select the photo having the most common descriptors with the audio data item for presentation, or alternatively, for example, to be presented first in the event multiple photos are displayed during the playing of Song X. The image data item selection component 140, based on the correlations shown in boxes 370 and 440 between Song X and Photos A and B, may, as shown in results 450, select Photo B over Photo A and return Photo B to the image data item selection component 140 to be presented during the playing of Song X.

FIG. 5 is a diagram illustrating example image data descriptors that are eligible for selection, for example by systems 100 and/or 200 described above. In the example illustrated, available image data descriptors 505 may be identified, for example, based on names associated with user devices 215, 220, 225 within range 205 of a client device 105, such as described above in reference to FIG. 2. The available image data descriptors 505 may, for example, be stored as a table associated with or accessible by server 125 and/or image data descriptor availability component 235. The available image data descriptors 505 may additionally or alternatively include other descriptors, such as theme, group event, location, age, or other descriptors that may or may not be utilized by the image data library 135.

In the example of FIG. 5, an image data library, user account, or other collection of image data may include Photos W, X, Y and Z shown in photo column 510 of FIG. 5 of table 540 of FIG. 5. Column 515 indicates certain image data descriptors associated with each photo. In particular, Bill is associated with Photo W, Jeff is associated with Photo X, Erin is associated with Photo Y, and Peter is associated with Photo Z. According to the example illustrated, based on available image data descriptors 505, it is determined that Photo W is associated with an available image descriptor (Bill) and that Photo Y is associated with an available image descriptor (Erin). Thus, as shown in column 520, Photos W and Y are eligible to be selected for display. The image data item selection component 140 may then select one or both of photos W and Y for display during playing of a song. As should be appreciated, this means that a photo of Bill (i.e., Photo W) and/or a photo of Erin (i.e., Photo Y) will displayed during playing of the song. In the karaoke example described above, this means that Bill and/or Erin will be selected to perform karaoke and sing along with the played song.

By contrast, based on available image data descriptors 505, it is determined that Photos X and Z are not associated with any of the available image descriptors. Thus, as shown in column 520, Photos X and Z are not eligible to be selected for display. In the karaoke example, this means that Jeff (i.e., Photo X) and Peter (i.e., Photo Z) will not be selected to perform karaoke and sing along with the played song.

Figure 6:
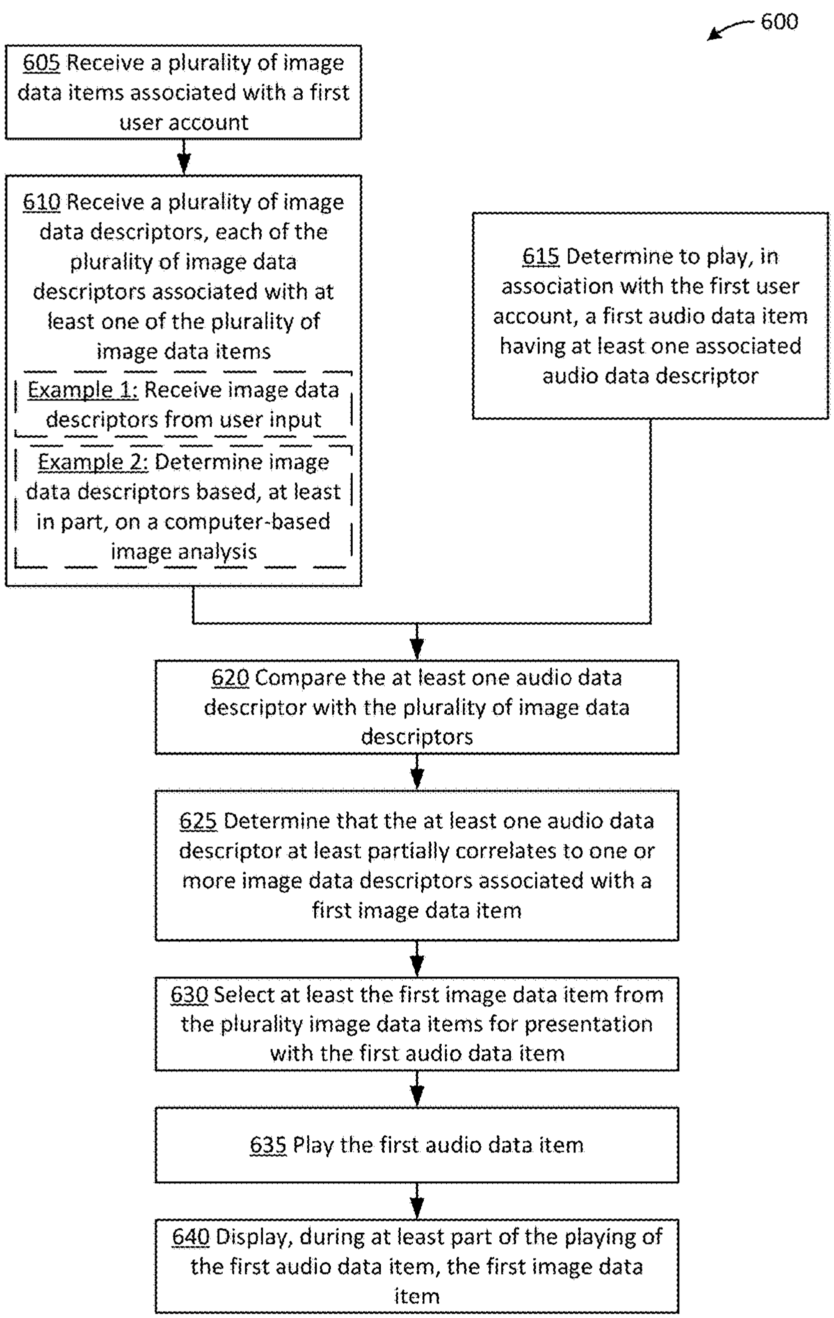
FIG. 6 is a flowchart illustrating an example process for integrating audio data with image data that may be used in accordance with the present disclosure.

FIG. 6 is a flowchart illustrating an example process 600 for integrating audio data with image data. Process 600 may be implemented by systems 100 or 200, and may also employ image data and audio data descriptors and correlations, such as the examples shown in FIGS. 3 and 4.

Process 600 may begin with receiving a plurality of image data items associated with a first user account, at operation 605. As set forth above, the received image data items may include, for example, photographs, graphical images, videos, and other image data items. Operation 605 may be performed, for example, by the image data library 135 implemented via server 125, for example via the uploading of image data items from a client device 105 also associated with the first user account. In other examples, operation 605 may include accessing image data items from another service, such as a social networking service, an image storage and manipulation service, and so on. In some cases, triggers may be established, for example, via a user interface implemented on client device 105, which may instruct the image data library 135 when to obtain image data items from other services or libraries. As also set forth above, the first user account may be a user account associated with, for example, a streaming music service or any other service related to presentation of image data and/or audio data.

Process 600 may proceed to operation 610, where a plurality of image data descriptors may be received, with each of the plurality of image data descriptors associated with at least one of the plurality of received image data items. As set forth above, the image data descriptors may describe contents of each associated image data item, such as a person or object that is displayed in the image data item and/or an attribute associated with a person or object that is displayed in the image data item. The image data descriptors may indicate, for example, one or more individuals, a group, a theme, an event, a location, an age, a date, a gender, and other descriptors or characteristics that may be displayed in or associated with an image data item. In one specific example (i.e., Example 1 shown within operation 610 in FIG. 6), one or more image descriptors may be received through user input. For example, as described above, a user may select, to associate with a particular image data item, one or more descriptors that the user considers to be related to the image data item. In another specific example (i.e., Example 2 shown within operation 610 in FIG. 6), one or more image descriptors may be determined based, at least in part, on an computer-based image analysis, such as object recognition and/or edge detection, that is performed on one or more image data items. For example, an object recognition analysis may identify, within a photograph, an umbrella, a ball, and waves, and may determine that the photograph should be associated with a beach or other similar image data descriptor. In some examples, operation 610 may be performed by image data library 135 and/or by the image data analysis component 145, as described above. For example, the image data analysis component 145 may analyze image data items received by image data library 135, e.g. perform a computer-based image analysis on the image data items, and determine image data descriptors to associate with each image, via the processes described above. In some cases, upon generating one or more image data descriptors, the image data analysis component 145 may request confirmation of the image data descriptors from a user via communication with the client device 105. Also, in some examples, image data descriptors may be received by client device 105, such as when provided by a user, and communicated to the image data library 135.

At operation 615, a determination may be made to play a first audio data item in association with the first user account. The first audio data item may have at least one associated audio descriptor. The first audio data item may include a song, for example, obtained from a streaming music service or other audio data library/service 130, and may be associated with at least one audio data descriptor, such as audio data descriptors 310, 315, or other audio data descriptors. In some cases, a particular audio data item and/or playlist of audio data items may be requested by a user, and operation 615 may include determining to play the audio data item based on such user requests. In other examples, a user may request a randomly selected audio data item and/or a shuffling of a playlist, and operation 615 may also include determining to play the audio data item based on these types of user requests.

Upon determining to play the first audio data item at operation 615, at least one audio data descriptor associated with the first audio data item may be compared to the plurality of image data descriptors at operation 620. In some examples, operation 620 may be performed by the image data item selection component 140 by accessing the image data descriptors associated with image data items 136-139 in the image data library 135 and by accessing the at least one audio data descriptor associated with the first audio data item from the audio data library/service 130. For example, as shown in FIGS. 3 and 4, it is seen that a first audio data item (e.g., Song X in FIGS. 3 and 4) has audio data descriptors including romantic and teen. These descriptors may then be compared to image data descriptors, such as the image data descriptors associated with Photo A in FIG. 3 and Photo B in FIG. 4.

Based on the comparison performed in operation 620, process 600 may proceed to operation 625, where it may be determined that at least one audio data descriptor associated with the first audio data item correlates or partially correlates to one or more image data descriptors associated with a first image data item of the plurality of image data items. For example, as shown in FIG. 4, the audio data descriptors for Song X (romantic and teen) correlate to two of the image data descriptors associated with Photo B (romantic and teen).

At operation 630, at least the first image data item from the plurality image data items may be selected for presentation with the first audio data item. The first image data item may be selected based, at least in part, on the correlation or partial correlation between the at least one audio data descriptor associated with the first audio data and one or more image data descriptors associated with the first image data item. For example, as described above in the example of FIG. 4, Photo B may be selected for presentation during the playing of Song X based on the correlation between audio data descriptors and image data descriptors for Song X and Photo B.

In some examples, there may be multiple image data items with at least one associated image descriptor that correlate or partially correlate to the one or more audio data descriptors. For example, as shown in FIG. 3, Photo B and Song X have one common audio descriptor (romantic). In these cases, various different strategies may be employed to select one or more image data items for display, such as displaying all image data items with correlating descriptors, displaying only the image data item that has the most correlated descriptors, displaying image data items that have more than a threshold number of correlated descriptors, ranking or weighting certain descriptors relative to other descriptors, or using any combinations of these or other techniques. Thus, as described above, in some examples, depending upon selected criteria, both Photo A and Photo B may be displayed during the playing of Song X.

In some examples, operation 630 may be performed, in whole or in part, by the image data item selection component 140 of FIGS. 1 and 2. In some cases, a record or indication of an association between an audio data item and one or more image data items with correlated descriptors may be stored and retained for potential future use. This may enable repeatable results upon selection of the same audio data item in the future and may consequently reduce the amount of time required to return and present a correlated image for presentation to client device 105. By contrast, in some examples, an image that is displayed during playing of a song may be prevented from being repeatedly displayed during a subsequent playing of the same song, such as to encourage greater variety among displayed images.

In some cases, the image data item selection component 140 and/or other components of system 100, 200 may record each correlation performed, for example, to enable adaptation of future correlations and image selections. In some examples, this may include machine learning. For example, a first audio data descriptor may be associated with a first song. After the performance of operations 620,625, and 630, one or more image data descriptors may be correlated with the first audio data descriptor and/or one or more image data items may be selected having the correlated image data descriptors. This correlation may be saved or stored. A request may later be received to play a second audio data item having one or more audio characteristics or descriptors in common with the first audio data item, such as the same artist, same album, and so on. In this scenario, the correlation between the first audio data descriptor associated with the first audio data item may be retrieved and used to better refine correlations for the second audio data item. This may further include accounting for explicit user selections of previous image data items to be presented (or excluded from being presented) in association with the playing of certain audio data items. In this way, over time, the image selections associated with a specific user account may be refined, to provide a personal and customized user experience.

Upon selection of the first image data item at operation 630, instructions may be sent to display, during at least part of the playing of the first audio data item, the first image data item. For example, these instructions may be sent from one or more servers to one or more clients and/or from various processing components on the one or more clients to presentation components, such as a display screen and/or audio speakers.

At operation 635, the first audio data item may be played. In some examples, the first audio data item may be streamed from a server to a client for playing. In other examples, the first audio data may be stored locally, such as at a client. In some examples, operation 635 may be performed by the audio playback component 115 of client device 105. At operation 640, the first image data item may be displayed during at least part of the playing of the first audio data item. In some examples, the first image data item may be provided from a server, such as from a server image data library. The first image data item may also sometimes be stored locally, such as at a client. In some examples, operation 640 may be performed by the display component 120 of client device 105.

In some examples, all or part of process 600 may be repeated for each selection of an audio data item for playing, for example, on a client device 105, including the selection of an audio playlist or other collection of audio data items, including those selected in response to random and/or shuffle selection requests.

Figure 7:
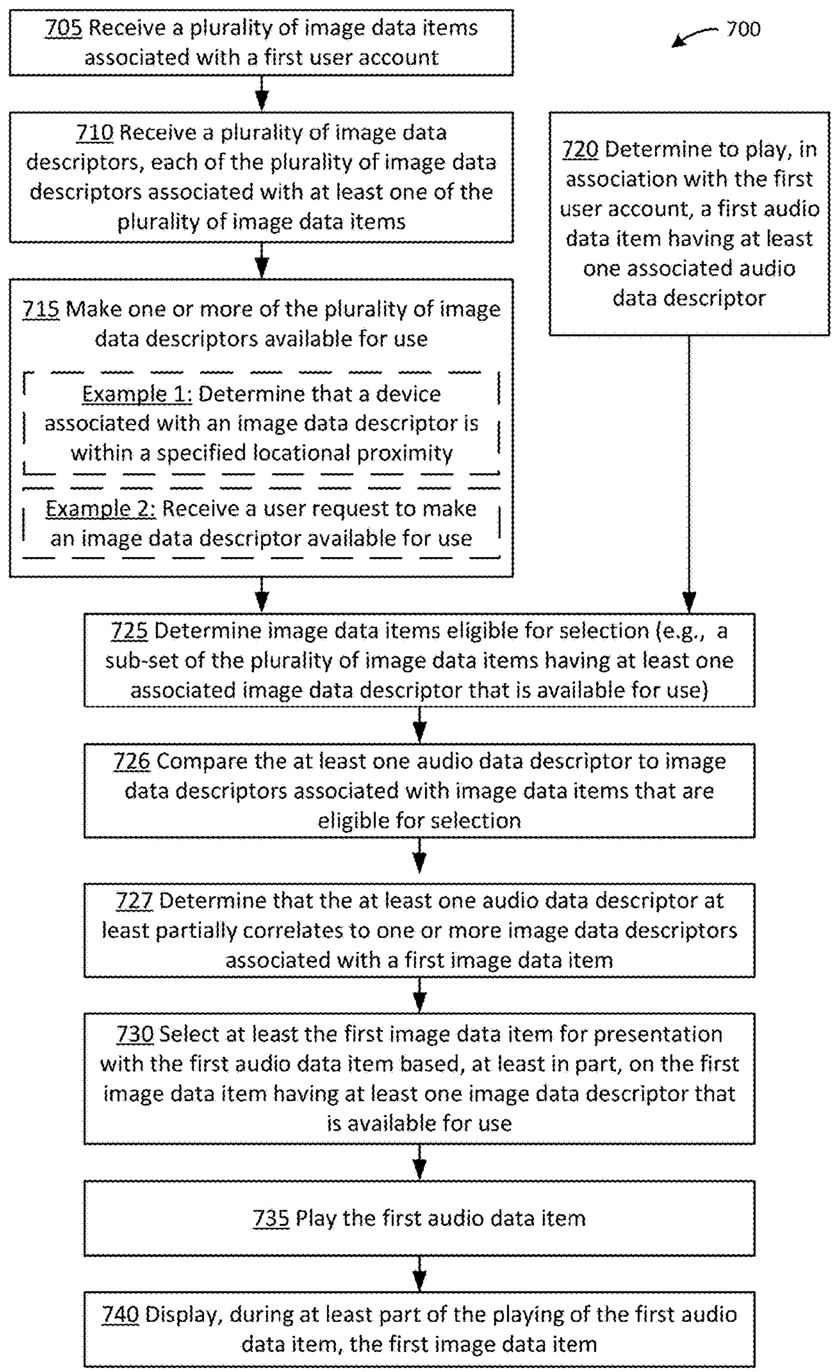
FIG. 7 is a flowchart illustrating an example process for or integrating audio data with image data based on available image data descriptors that may be used in accordance with the present disclosure.

FIG. 7 is a flowchart illustrating an example process 700 for integrating audio data with image data based on available image data descriptors. Certain operations of process 700 may be duplicative of operations of process 600 described above, and accordingly, will not be described in detail again here.

Process 700 may begin with receiving a plurality of image data items associated with a first user account, at operation 705. Operation 705 is similar to operation 605 described above and accordingly, will not be described in detail again here.

Process 700 may proceed to operation 710, where a plurality of image data descriptors may be received, with each of the plurality of image data descriptors associated with at least one of the plurality of received image data items. Operation 710 is similar to operation 610 described above and accordingly, will not be described in detail again here.

At operation 715, one or more image data descriptors may be made available for use. In one specific example (i.e., Example 1 shown within operation 715 in FIG. 7), an image data descriptor may be made available for use based, at least in part, on a determination that a device associated with the image data descriptor is within a specified locational proximity, such as a proximity of a particular client device. This example is illustrated in FIG. 2, in which a number of user devices (e.g., user devices 215, 220 and 225) are located within a locational proximity of 205 of client 105. Descriptors associated with devices 215, 220 and 225, such as names and identifiers of owners and operators of these devices, may, therefore, be made available for use. By contrast, user device 230 is not within a locational proximity of 205 of client 105. Descriptors associated with devices 230, such as names and identifiers of owners and operators of the device, may, therefore, not be available for use. As set forth above, it may sometimes be desirable to display images associated with people within a room or within a particular proximity or location to the displayed images. For example, in a karaoke implementation, it may be desirable to display images of certain people in a room or location as a queue for those people to sing along with played music.

In another specific example (i.e., Example 2 shown within operation 715 in FIG. 7), an image data descriptor may be made available for use based, at least in part, on a user request to make to make the image descriptor available for use. For example, a user may invite certain friends and/or family to a party, and the user may then request that image data descriptors associated with the invited friends and/or family be made available for use during the party.

At operation 720, a determination may be made to play a first audio data item in association with the first user account. The first audio data item may have at least one associated audio data descriptor. Operation 720 is similar to operation 615 described above and accordingly, will not be described in detail again here.

At operation 725, image data items that are eligible for selection are determined. The image data items that are eligible for selection may include a sub-set of the plurality of image data items having at least one associated image data descriptor that is available for use is. For example, referring back to FIG. 5, an example list of available image data descriptors 505 includes three image data descriptors (Bill, Mary, and Todd). Additionally, as shown in column 510, an example plurality of image data items includes four photos (Photos W, Photo X, Photo Y and Photo Z). At operation 725, it may be determined which of Photos W, X, Y and Z are eligible for selection. Based on available image data descriptors 505, it is determined that Photo W is associated with an available image descriptor (Bill) and that Photo Y is associated with an available image descriptor (Erin). Thus, as shown in column 520, Photos W and Y are eligible to be selected for display. By contrast, based on available image data descriptors 505, it is determined that Photos X and Z are not associated with any of the available image descriptors. Thus, as shown in column 520, Photos X and Z are not eligible to be selected for display.

At operation 726, the at least one audio data descriptor associated with the first audio data item is compared to image data descriptors associated with the image data items that are determined to be eligible for selection. At operation 727, it is determined that the at least one audio data descriptor associated with the first audio data item at least partially correlates to one or more audio data descriptors associated with a first image data item. It is noted that many example processes for comparing of audio data descriptors to image data descriptors and determining correlations between descriptors are described in detail above and are not repeated here.

At operation 730, at least the first image data item is selected for presentation with the first audio data item based, at least in part, on the first image data item having at least one image data descriptor that is available for use. Referring again to the example of FIG. 5, as shown in column 520, Photos W and Y are eligible to be selected for display by each having at least one associated image descriptor that is available for use. Accordingly, at operation 730, at least one of Photo W or Photo Y may be selected for presentation with the first audio data item. It is noted that, in addition to their each having at least associated available image data descriptor, any other desired techniques may be employed for selecting of either or both of Photo W or Photo Y for display. In some cases, the first image data item may also be selected for presentation with the first audio data item based, at least in part, on the first image data item having at least one associated image data descriptor that at least partially correlates to at least audio data descriptor associated with the first audio data item. For example, consider a scenario in which Photo W has at least one associated image data descriptor that at least partially correlates to at least audio data descriptor associated with the first audio data item and Photo Y has no associated image data descriptors that at least partially correlate to at least audio data descriptor associated with the first audio data item. In his scenario, Photo W may sometimes be selected over Photo Y for presentation with the first audio data item based on Photo W having a higher correlation to the first audio data item than Photo Y. In some examples, it may be desirable to ensure that, when a collection of audio data items are played, that at least one image data item corresponding to each available person or image descriptor within a room or location is displayed. In particular, in the karaoke example, displaying at least one image data item corresponding to each available person or image descriptor may ensure that each person within a room or location has an opportunity to perform karaoke.

Upon selection of the first image data item at operation 730, instructions may be sent to display, during at least part of the playing of the first audio data item, the first image data item. For example, these instructions may be sent from one or more servers to one or more clients and/or from various processing components on the one or more clients to presentation components, such as a display screen and/or audio speakers.

At operation 735, the first audio data item may be played. In some examples, the first audio data item may be streamed from a server to a client for playing. In other examples, the first audio data may be stored locally, such as at a client. In some examples, operation 735 may be performed by the audio playback component 115 of client device 105. At operation 740, the first image data item may be displayed during at least part of the playing of the first audio data item. In some examples, the first image data item may be provided from a server, such as from a server image data library. The first image data item may also sometimes be stored locally, such as at a client. In some examples, operation 740 may be performed by the display component 120 of client device 105.

In some examples, all or part of process 700 may be repeated for each selection of an audio data item for playing, for example, on a client device 105.

Figure 8:
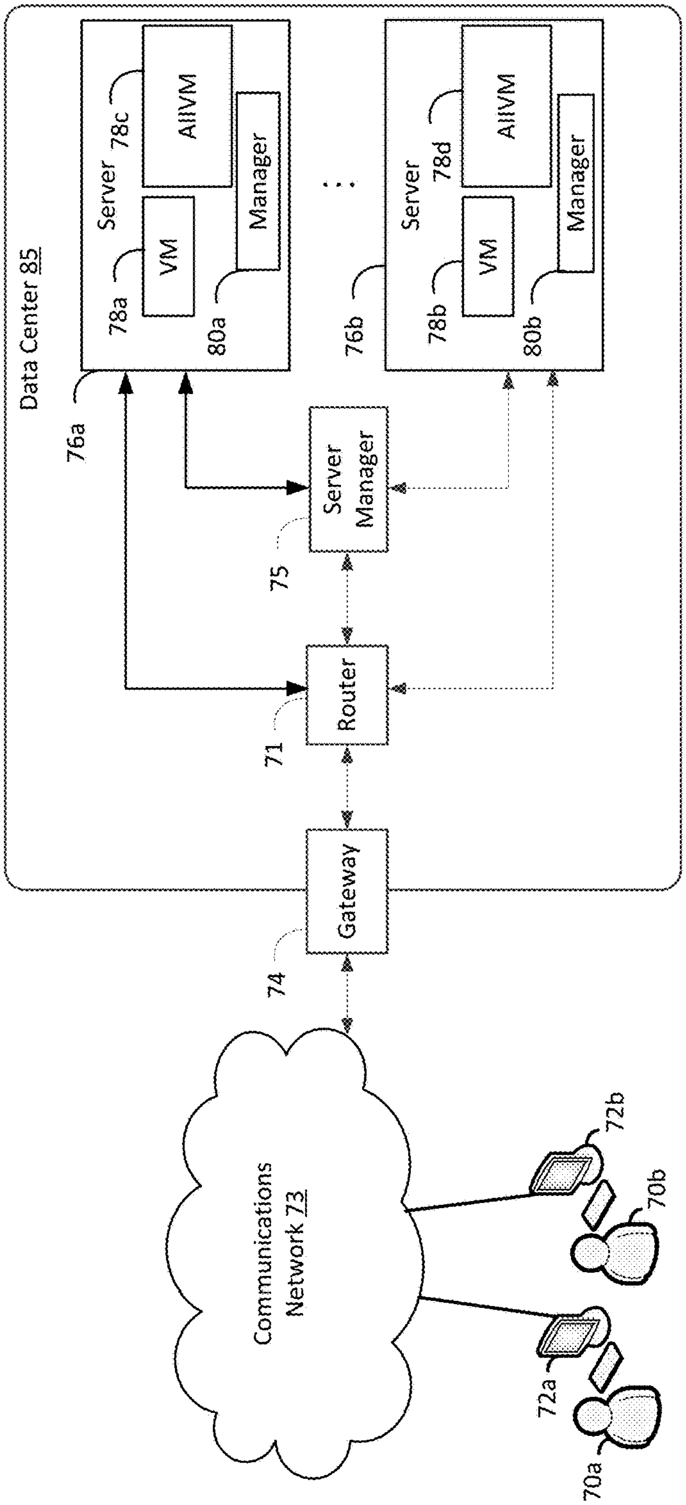
FIG. 8 is a diagram illustrating an example computing system that may be used in some embodiments.

An example system for providing electronically presented content, such as audio data items and/or image data items, will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78). Virtual machine instances 78*c* and 78*d* are audio image integration virtual machine ("AIIVM") instances. The AIIVM virtual machine instances 78*c* and 78*d* may be configured to perform all, or any portion, of the techniques for virtual area generation and manipulation and/or any other of the disclosed techniques in accordance with the present disclosure and described in detail above. As should be appreciated, while the particular example illustrated in FIG. 8 includes one AIIVM virtual machine in each server, this is merely an example. A server may include more than one AIIVM virtual machine or may not include any AIIVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be standard servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76*a* and 76*b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 9:
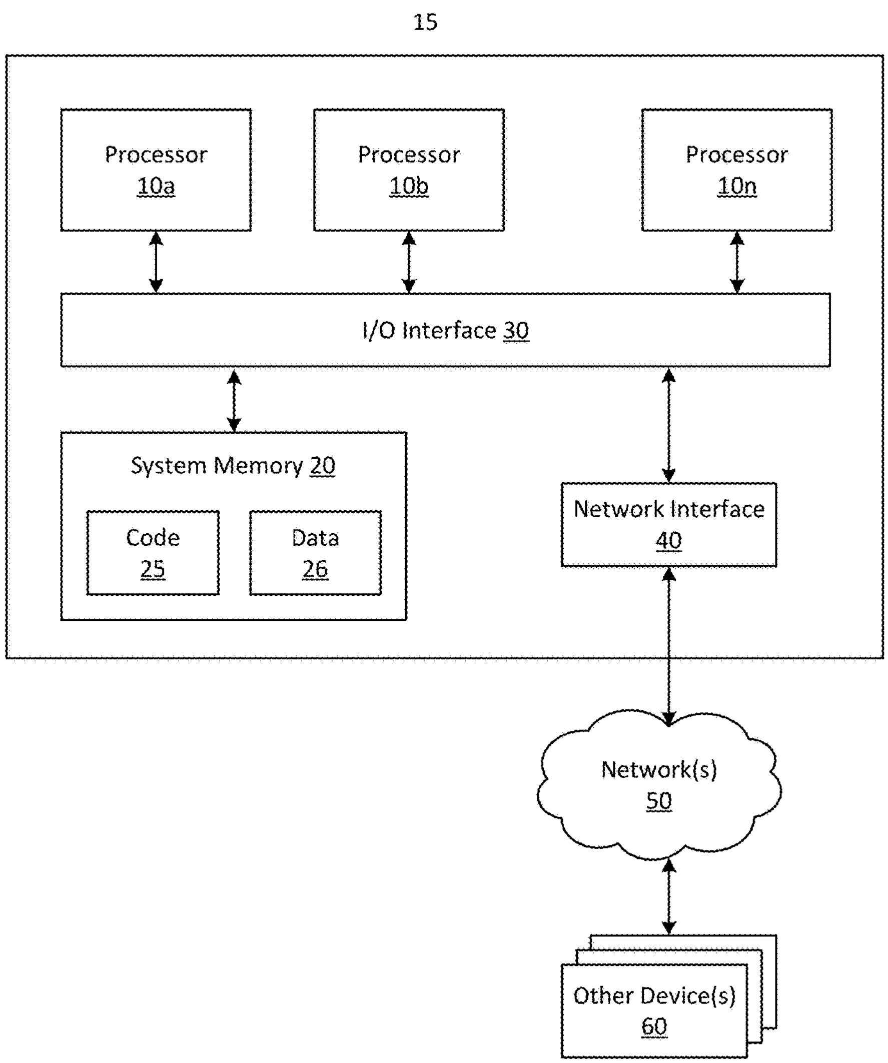
FIG. 9 is a diagram illustrating another example computing system that may be used in some embodiments.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:

one or more processors; and one or more memories storing a set of instructions, which if executed by the one or more processors, causes the one or more processors to perform operations comprising:

receiving a plurality of image data descriptors, each of the plurality of image data descriptors describing contents of at least one of a plurality of image data items;

making a first image data descriptor of the plurality of image data descriptors available for use based, at least in part, on a first device associated with the first image data descriptor being within a locational proximity of a second device;

selecting, based at least in part on the first image data descriptor, at least a first image data item from the plurality of image data items; and presenting the first image data item as an indication to a user of the first device to interact with an application running on the second device while the second device plays an audio data item.

2. The system of claim 1, wherein at least one of the plurality of image data descriptors is determined based, at least in part, on a computer-based image analysis of one or more of the plurality of image data items.

3. The system of claim 1, wherein the first image data item is further selected based, in part, on a correlation between at least one audio data descriptor associated with the audio data item and one or more image data descriptors associated with the first image data item.

4. The system of claim 1, wherein the plurality of image data descriptors comprise an indication of at least one of an individual, a group, a theme, an event, a location, an age, a date, or a gender.

5. The system of claim 1, wherein the plurality of image data items are associated with a first user account of a streaming music service.

6. The system of claim 1, wherein the first image data item comprises at least one of a photograph or a video.

7. The system of claim 1, wherein at least one of the plurality of image data descriptors is received from user input.

8. A method comprising:

receiving a plurality of image data descriptors, each of the plurality of image data descriptors describing contents of at least one of a plurality of image data items;

making a first image data descriptor of the plurality of image data descriptors available for use based, at least in part, on a first device associated with the first image data descriptor being within a locational proximity of a second device;

selecting, based at least in part on the first image data descriptor, at least a first image data item from the plurality of image data items; and presenting the first image data item as an indication to a user of the first device to interact with an application running on the second device while the second device plays an audio data item.

9. The method of claim 8, wherein at least one of the plurality of image data descriptors is determined based, at least in part, on a computer-based image analysis of one or more of the plurality of image data items.

10. The method of claim 8, wherein the first image data item is further selected based, in part, on a correlation between at least one audio data descriptor associated with the audio data item and one or more image data descriptors associated with the first image data item.

11. The method of claim 8, wherein the plurality of image data descriptors comprise an indication of at least one of an individual, a group, a theme, an event, a location, an age, a date, or a gender.

12. The method of claim 8, wherein the plurality of image data items are associated with a first user account of a streaming music service.

13. The method of claim 8, wherein the first image data item comprises at least one of a photograph or a video.

14. The method of claim 8, wherein at least one of the plurality of image data descriptors is received from user input.

15. A non-transitory computer-readable medium having stored thereon a set of instructions, which if performed by one or more processors, causes the one or more processors to perform operations comprising:

receiving a plurality of image data descriptors, each of the plurality of image data descriptors describing contents of at least one of a plurality of image data items;

making a first image data descriptor of the plurality of image data descriptors available for use based, at least in part, on a first device associated with the first image data descriptor being within a locational proximity of a second device;

selecting, based at least in part on the first image data descriptor, at least a first image data item from the plurality of image data items; and presenting the first image data item as an indication to a user of the first device to interact with an application running on the second device while the second device plays an audio data item.

16. The non-transitory computer-readable medium of claim 15, wherein at least one of the plurality of image data descriptors is determined based, at least in part, on a computer-based image analysis of one or more of the plurality of image data items.

17. The non-transitory computer-readable medium of claim 15, wherein the first image data item is further selected based, in part, on a correlation between at least one audio data descriptor associated with the audio data item and one or more image data descriptors associated with the first image data item.

18. The non-transitory computer-readable medium of claim 15, wherein the plurality of image data descriptors comprise an indication of at least one of an individual, a group, a theme, an event, a location, an age, a date, or a gender.

19. The non-transitory computer-readable medium of claim 15, wherein the plurality of image data items are associated with a first user account of a streaming music service.

20. The non-transitory computer-readable medium of claim 15, wherein the first image data item comprises at least one of a photograph or a video.

* * * * *